United States Patent [19]

Chau et al.

[11] Patent Number: 4,933,847
[45] Date of Patent: Jun. 12, 1990

[54] MICROCODE BRANCH BASED UPON OPERAND LENGTH AND ALIGNMENT

[75] Inventors: Vi Chau, Rochester, Minn.; Harold E. Frye, Poughkeepsie; Mark R. Funk, Rochester, Minn.; Lynn A. McMahon, Rochester, Minn.; Bruce R. Petz, Rochester, Minn.

[73] Assignee: International Business Machines Corporation, Armonk, N.Y.

[21] Appl. No.: 121,443

[22] Filed: Nov. 17, 1987

[51] Int. Cl.$^5$ .......................... G06F 9/30; G06F 9/40
[52] U.S. Cl. ................................ 364/200; 364/261.3; 364/261.4; 364/262.4
[58] Field of Search ... 364/200 MS File, 900 MS File

[56] References Cited

U.S. PATENT DOCUMENTS

| | | | |
|---|---|---|---|
| 3,570,006 | 1/1968 | Hoff et al. | 364/200 |
| 3,979,725 | 8/1976 | Disparte et al. | 364/200 |
| 4,200,927 | 4/1980 | Hughes et al. | 364/200 |
| 4,430,706 | 10/1980 | Sand | 364/200 |
| 4,438,492 | 3/1984 | Harmon, Jr. et al. | 364/200 |
| 4,569,016 | 2/1986 | Hao et al. | 364/200 |
| 4,791,557 | 12/1988 | Angel et al. | 364/200 |

OTHER PUBLICATIONS

IBM System/38 Theory-Maintenance Manual SY3-1-0649-2-Section 05, Theory, Beginning at p. 05-070.

Primary Examiner—Eddie P. Chan
Assistant Examiner—Kevin A. Kriess
Attorney, Agent, or Firm—Francis A. Sirr; Bradley A. Forrest

[57] ABSTRACT

A microcode branch, to one of a number of possible control words (sixteen control words are described), is based upon (1) the remaining operand length that is to be processed by a left to right instruction, and (2) by the byte alignment of the portion of the operand that currently resides in main storage interface registers. As a left to right instruction is being executed, the operand's new length and its new alignment, as they both will exist after a control word is executed, are determined. The new length and the new alignment are used to determine the addess of the next control word. A 16-way branch instruction has branch legs that are determined by the number of operand bytes that are left to be processed, and by the alignment of two operands in two storage registers that interface with main storage. This method and arrangement for microcode branching maximizes the amount of data that can be processed per processor cycle by the hardware upon execution of a left to right instruction.

8 Claims, 4 Drawing Sheets

MICROCODE BRANCH BASED UPON OPERAND LENGTH AND ALIGNMENT

TECHNICAL FIELD

This invention relates to the field of data processing systems, and more particularly to methods and apparatus for manipulating data in main storage by means of left to right instructions (i.e. variable length operands are processed from low memory address to a higher memory address, or the equivalent thereof), wherein microcode for accomplishing left to right instructions performs a branch based upon (1) operand length, and (2) its alignment.

BACKGROUND AND SUMMARY OF THE INVENTION

The invention relates to microprogram controlled computers or data processing systems. These computers use a minimum of hardware controls. The controls of a microprogram controlled computer are mainly data gates that route data into and out of registers, counters, adders, and so on. In this system, one instruction (program instruction, microcode, microinstruction or control word) provides the data gates and controls for one machine cycle. A new instruction is read out of control storage during each machine (CPU or system) cycle.

Each instruction is segmented into a number of control fields. Each control field activates a specific hardware control in the system.

One of these control fields pertains to (and may at least partially define) the address of the next program instruction. In branching situations, the control field of the current instruction is used, in combination with other data, to form or define the address of the next instruction. In this case, the branch address is dependent upon said other data.

The present invention relates to program branching that can occur when a left to right instruction is being executed, where the branch address is defined, in accordance with the invention, by two data elements, namely, (1) the length of the data operands involved in the left to right instruction, and (2) the alignment of that portion of the operands presently in two or more registers that interface with main data storage.

Conditional branching is well known in the data processing art. Some examples are as follows.

U.S. Pat. No. 3,570,006 describes an arrangement for multiple branching wherein a plurality of predefined branch addresses are pre-established in a plurality of branch address registers. As the program executes, branch conditions are tested. When a test condition is satisfied, this fact is stored in a particular one of a plurality of flip-flops. Scanning of the flip-flops enables the predefined program branch addresses to be used to address memory.

U.S. Pat. No. 3,979,725 discloses an arrangement for multi-way program branching wherein a branch address is in part based upon the contents of the data in a register. More specifically, sixteen read-only PROMs are arranged in four groups of four PROMs. Two bits of a 16-bit instruction currently being executed are used to address the PROMs. Two other bits of the instruction are used in combination with the output of the addressed PROM to address the next instruction when a branch condition occurs. The output of the addressed PROMs is a function of the data in a register.

U.S. Pat. No. 4,430,706 discloses an arrangement for loading the next program address, or alternatively a branch address, based upon whether or not the program branched the last time the program was executed.

Figure 1:
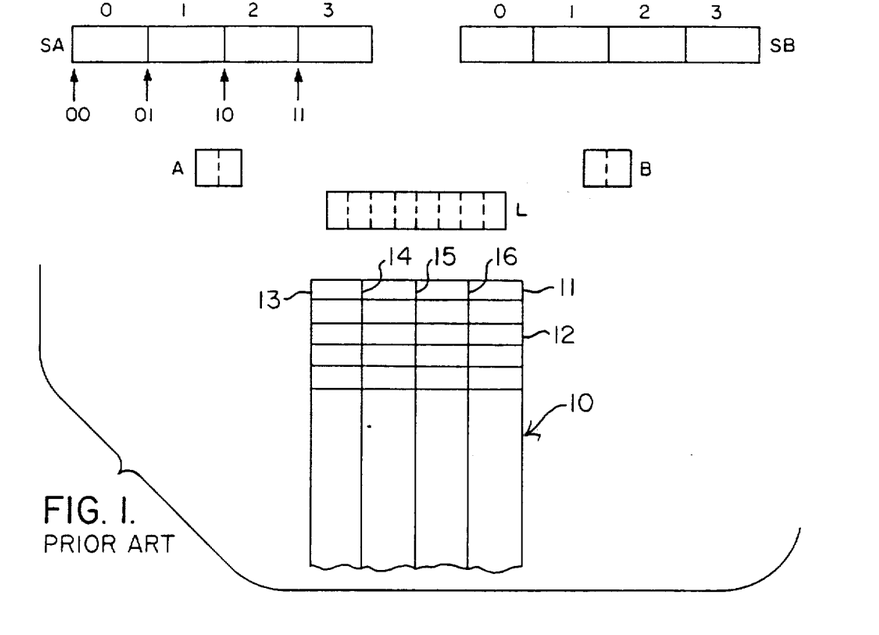
FIG. 1 is a showing of a related portion of the prior art IBM System 38 data processing system.

A related portion of the prior IBM System 38 data processing system is shown in FIG. 1. This prior system provides a form of branching when executing left to right instructions.

This prior system is described in the IBM System/38 Theory-Maintenance manual SY31-0649-2, incorporated herein by reference.

The System 38 processing system is typical of systems that process strings of multi-byte data that resides in consecutive byte aligned memory locations in main memory storage 10.

When this prior data processing system executes a left to right instruction, a 4-way microcode branch is possible, based upon (1) the byte length of the portion of data operand that remains to be processed, and (2) alignment of the portion of the operands (which may be the entire operands) in two registers SA and SB that interface to main storage 10. The byte length parameter is contained in 8-bit register L. The alignment parameter for each of the registers SA and SB is contained in 2-bit registers A and B, respectively.

The System 38's architecture supports a set of left to right instructions that process data that is stored in main memory 10. As shown in FIG. 1, memory 10 is one word (i.e. four bytes or 32 bits) wide. Data in memory 10 is processed from a low memory address, such as 11, toward a higher memory address, such as 12, when executing a left to right instruction.

Examples of System 38 left to right instructions are; Move Characters (MVC), Compare Logical Characters (CLC), And Character (NC), Or Character (OC), Exclusive Or Character (XC), Move Byte Immediate And Propagate (MVBIP), Move Character Long (MVCL), and Compare Logical Characters Long (CLCL). Instructions of the left to right type are frequently used by a programmer.

A limitation of this prior system is that in general it can process only one byte of data for each machine cycle. Two bytes, or four bytes for move instructions, can be processed simultaneously if the data alignment and length permit, but additional machine cycles and microcode are required to detect and exploit this capability, thus limiting the usefulness of doing so.

While the data bus of the System 38 is 4 bytes wide, its ALU is only 2 bytes wide and can process two bytes only when the data is halfword aligned. Thus, for those left to right instructions that utilize the ALU, generally only one operand byte is processed per machine cycle. However, based upon the content of the length register and one of the pointer registers (i.e. not both pointer registers as in the present invention), a maximum of two operand bytes are sometimes processed. However, System 38 is not capable of handling this larger quantity of data in one machine cycle, additional cycles being required to determine that the favorable combination of length and alignments exists.

In addition, for those left to right instructions that do not utilize the ALU while executing the instruction, the System 38 is capable of processing up to 4 operand bytes. Again this operation is based upon the content of the length register and only one of the pointer registers, and the system is not capable of handling this quantity of data in one machine cycle, additional cycles being required to determine that the favorable combination of length and alignments exists.

An important distinction of the present invention is that its MBR branch feature processes the maximum, variable, byte-quantity of operand that the machine's architecture will allow, and that this byte-quantity of operand is processed in only one machine cycle.

In each of the System 38's left to right instructions, the instruction contains (1) the address in main memory 10 where the first byte of the operand(s) can be found, (2) the byte length of the operand(s) to be fetched from memory 10, and (3) a pointer that points to the first byte of the operand(s) within the full data word that is stored at the identified address (i.e. the byte boundary 13, 14, 15 or 16 at which the operand(s) begins in the memory location that is addressed in memory 10).

The byte length of an operand may be of any integer count, up to a maximum length of 256 bytes. The operand(s) that is so defined by the instruction may exist in main memory 10 at any address, and with its first byte aligned on any of the byte boundaries 13, 14, 15 or 16 (i.e. the first byte of an operand may begin at any address such as 11 or 12, and at any of the byte boundaries within the addressed full word of memory 10). Boundary 13 is called a full word (FW) boundary, whereas boundary 15 is called a half word (HW) boundary.

The System 38 main data bus (not shown) is 4 bytes wide.

Main storage interface registers SA and SB are both 32 bits (four bytes or a FW) wide. Each of the registers SA and SB is provided with a 2-bit pointer register A and B, respectively. As shown in FIG. 1, when register A contains "00" register A points to byte 0 in register SA, when register A contains "01" it points to byte 1 in register SA, etc. This same relationship exists between register SB and pointer B.

As data is processed, one byte per cycle, registers A and B are incremented by "1" for each cycle, and register L is decremented by "1" for each cycle.

When the pointer register corresponding to one (or both) of the registers SA or SB reaches the count "11" (and assuming the 8-bit L register is not "00000000"), it is an indication that the FW content of that register must be stored, and/or that the FW content of the next higher address of memory 10 must be fetched and loaded into that register.

As described beginning at page 05-070 of the above mentioned manual, part of the data contained in a microinstruction is used to create part of the control storage address for the next microinstruction. In the case of a left to right instruction, this next microinstruction may be one of four possible microinstructions.

Each System 38 left to right microinstruction includes a field called "next address". This field, in combination with conditions such as the state of pointer registers A and B and length register L (FIG. 1), provides the address of the next microinstruction. In this arrangement, the 4-way left to right instruction branch is controlled by the state of registers A, B and L at the beginning of the cycle.

The construction and arrangement of the System 38 is such that a microinstruction can be executed in the same cycle in which the above mentioned registers A, B and L are altered and the address of the next microinstruction is determined. In addition, a register SA or SB can be used as both a source and a destination in the same cycle. Thus, a cycle is not skipped in order to accomplish these functions.

The address of the next instruction is generated early in the cycle of the currently executing instruction. This allows accessing of the next instruction to begin as soon as possible in the current cycle.

As mentioned, register L is initially loaded with the byte length of the operand(s) to be loaded from memory 10 and to be operated upon by the left to right instruction. This byte length is contained in the left to right instruction itself. As previously stated, this length parameter may be as long as 256 bytes. The length value in the L register is biased by 1, such that a value of 0 represents a length of 1.

As bytes of the operand are processed by the left to right instruction, the content of register L is decremented, once for each byte that is processed. When the content of register L becomes zero, or "00000000" at the start of a microinstruction, it is an indication that the microinstruction processed the last byte of the operand, and that the left to right instruction has been completed. L=0 generally indicates that one byte remains. When a byte is processed and L was 0 at the beginning of the cycle, it is an indication that all bytes have been processed.

More specifically, a test of the L register in which the presence of the state "00000000" is detected causes an address bit "1" to be generated as a bit 13 of the next microinstruction's address.

The two above mentioned test bits are assembled into a 14-bit address (i.e. bits 0 through 13) whose bit 12 is generated by testing registers A and B, and whose bit 13 is generated by testing the L register. The four possible states of these two address bits are "00", "01", "10" or "11". These four states determine which of the four possible microcode branches will occur.

In summary, when these two bits of the "next address" are "11" (signifying that the last byte of register SA/SB has been accessed, and that the last operand byte has been processed), or "01" (signifying that the last byte of register SA/SB has not been processed, but that the last operand byte has been processed), the end of the left to right instruction is indicated, and the next program instruction is fetched.

When the content of these two address bits is "00" (signifying that the last byte of register SA/SB has not been processed, and that the last byte of the operand has not been processed), the next byte in register SA/SB is processed.

When the content of these two address bits is "10" (signifying that the last byte of register SA/SB has been processed, but that bytes of the operand remain to be processed), the FW data content at the next higher address of memory 10 is fetched/stored to/from the registers SA/SB. In some cases, an additional cycle is required to determine whether to fetch and/or store.

While the prior systems, such as System 38, are satisfactory, the present invention provides a more efficient 16-way branch, providing more efficient use of processor hardware when executing left to right microcode instructions, thereby decreasing the number of processor cycles required to execute left to right instructions.

An important distinction between the prior System 38 and the present invention is that the length register L of the System 38 was usually used only to determine if a portion of the operand remained to be processed, i.e. except for a branch indicating that an entire word remained to be processed, the number of bytes remaining to be processed were not used as a branch parameter in System 38.

The branches available on system 38 do not allow the combination of remaining length and operand alignments to be analyzed in a single cycle such that the optimum number of bytes could be processed in the following cycle.

In the present invention, on the other hand, the amount of the operand to be processed is critical to branching. Namely, the number of bytes to be processed is determined, and branching occurs based upon the amount of operand that remains.

In this way, the present invention uses the system's dataflow paths most efficiently for the particular operand length that remains.

THE INVENTION

The invention will be described in relation to microprogram controlled data processing systems. The concept of microprogram control is that one microinstruction (instruction or control word) provides the data gates and controls for one cycle of the system (CPU or machine) cycle. A new control word is read from control storage during each machine cycle.

Each control word is segmented into a number of control fields. These control fields are used to perform the functions that are required during the CPU cycle. For example, a control field may activate a specific hardware control in the system, such as an input gate, ALU control, or operand fetching.

These control words are contained in control storage, and they are sometimes referred to as horizontal microcode, or HMC. Program instructions, such as left to right instructions, are contained in main storage.

A new instruction is read out of control storage each machine cycle. Part of the data (i.e. the address field) contained in one instruction is used to create the control storage address of the next instruction. The address field contained in an instruction may be modified, to thereby create a branch condition. Thus, branching conditions are determined by (1) the address field in the current instruction, and (2) data sensitive conditions that have been previously tested, and flags have been set accordingly.

Stated differently, in a machine cycle the CPU executes the current microinstruction, and forms the control storage address to be used in fetching the next microinstruction, and fetches said instruction.

Figure 5:
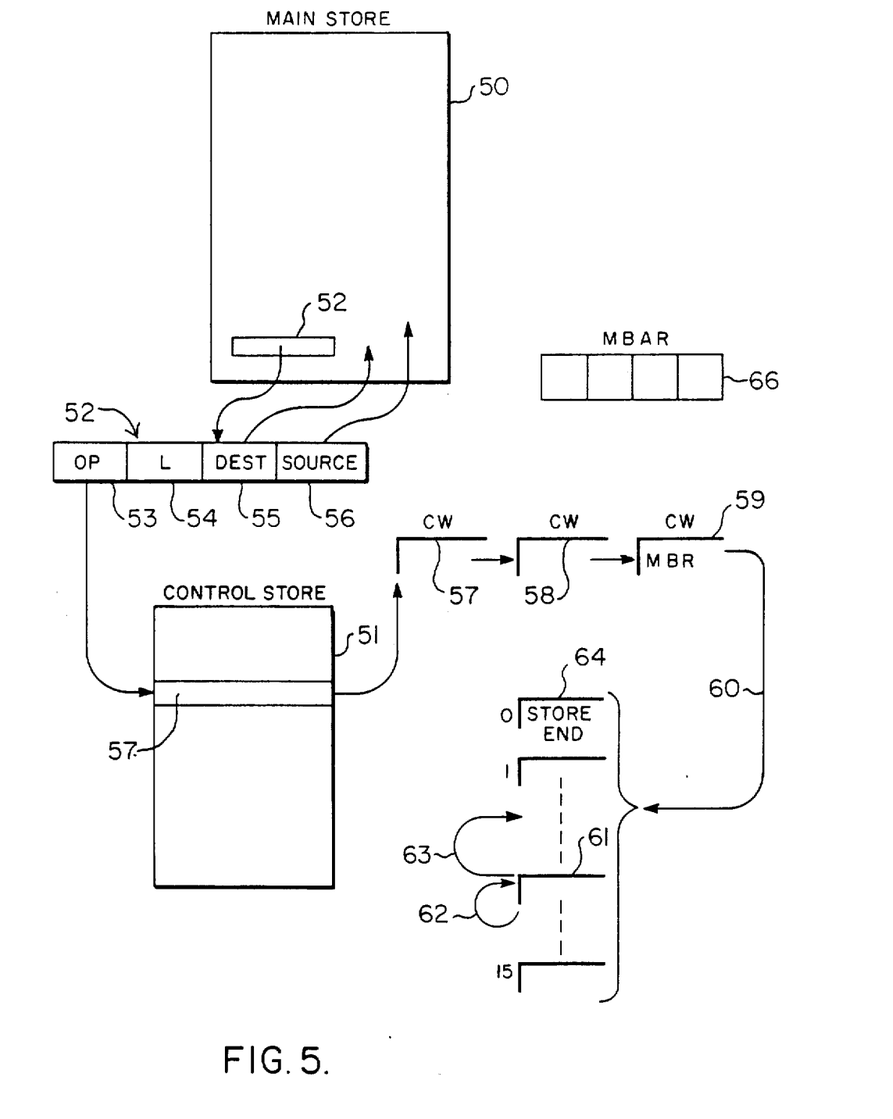
FIG. 5 shows the main storage and the control storage of a data processing system, and is used to explain operation of the invention.

FIG. 5 is helpful in understanding the basic concept of the invention. In this figure a data processing system's main storage is shown at 50, and its control store is shown at 51. Program instructions are contained in main store 50. Control words are contained in control storage 51.

Shown at 52 is a left to right instruction. While this instruction is intended to be any one of a number of possible left to right instructions, the particular instruction 52 contains both a source and a destination. More specifically, instruction 52 contains an OP code field 53, a length field 54, and two fields 55 and 56 that contain the main storage addresses of the destination operand and the source operand. Field 53 contains the name or identity of this particular left to right instruction, for example, it may be a Move Characters (MVC) instruction. Field 54 contains the length of the operand, in bytes. Fields 55 and 56 point to the address in main storage 50 of the destination operand and the source operand.

Field 53 is used to address a particular control word 57 in control store 51. This control word is executed, and points to another control word 58 as the control word next to be executed as processing of instruction 52 continues. Since instruction 52 is a left to right instruction, one of the control words 59 will designate the MBR function of this invention. MBR is a microcode branch command that invokes the mechanism of this invention. When this control word is encountered, processing of control words enters the invention's branch structure 60. Entry is based upon (1) the operand length that remains to be processed, and (2) operand alignment in the operand-containing registers that interface to main storage 50.

As shown in FIG. 5, the control words comprising branch structure 60 contain control words such as 61 that specify MBR. Executing a control word such as 61 can cause that control word (arrow 62) to again be processed, or can cause execution of a different control word (arrow 63) to occur.

As processing of left to right instruction 52 concludes, a control word represented at 64 is encountered. As a result, the last bytes of the operand are stored to the destination address specified in instruction 52, and another program instruction is fetched from main store 50.

As an example, and in accordance with the invention, the last two cycles of a data processing system having an 8-byte wide data bus would comprise (assuming six bytes of the operand remain to be processed and that all six bytes of these bytes are in a register), (1) process two bytes of the operand in one cycle, and then (2) process four bytes of the operand, store to the destination address, and end, in the last cycle.

Figure 2:
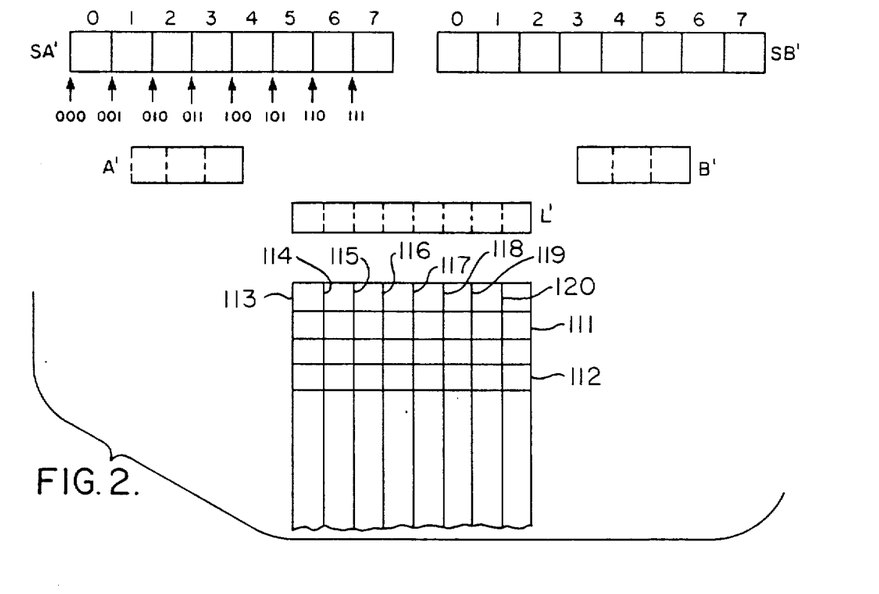
FIG. 2 is a showing of the present invention applied to a data processing system having double word (DW) architecture.

A double word (DW) architecture data processing system in accordance with the present invention is shown in FIG. 2. This system includes a main storage bus that is 64-bits wide, i.e. double word (DW) wide. A pair of internal processor storage registers SA' and SB' are provided that are also DW wide. A 3-bit pointer register, A' and B', is associated with each of the registers SA' and SB'. The content of a pointer register points to one of the eight bytes in its associated storage register.

An 8-bit L' register is provided to specify the byte length of the operand that remains to be processed by a left to right instruction.

A main data bus that is 8 bytes wide (not shown) is also provided.

When left to right instructions are executed, all data fetches from main storage memory to registers SA' and/or SB' result in a DW being fetched from memory to SA' and/or SB'.

The processor of the invention, which contains above mentioned registers SA' and SB', has the following fullword (FW), halfword (HW) and byte dataflow paths that assist in the execution of left to right instructions; (1) FW moves from any aligned FW in SA' or SB' to any aligned FW in SA' or SB', wherein FW moves can be specified either directly through the use of the FW register name or indirectly through the use of the A' or B' registers; (2) HW moves and ALU operations from any byte aligned HW in registers SA' or SB' to any byte aligned HW in SA' or SB', as pointed to by the A' or the B' registers, respectively; and (3) byte moves and ALU operations from any byte in registers SA' or SB' as pointed to by registers A' or B', respectively.

In addition, the processor of FIG. 2 is constructed and arranged so that fetches to, and stores from, registers SA' or SB' can begin in the same cycle as the cycle in which the original contents of the register are used as a source and/or destination in a move or an ALU operation.

Efficient use of these dataflow paths, resulting in increased processor performance, is provided by the Move Character Branch (MBR) of the invention. MBR is a microcode branch that repeatedly determines with each processor cycle, through the use of the content of the L' register and the alignment of the operand as defined by the A' and B' registers, which of 16 control words should be used next during the processing of a left to right instruction.

Each of the 16 control words are the first control words, in sets of one or more control word sequences, that efficiently use the available dataflow to process a predetermined amount of each operand.

Data storage memory 100 is two words wide (DW), i.e. each memory location, such as 111 and 112, contains 8 bytes (64 bits) of byte aligned data. A data operand can begin at any of the byte boundaries 113, 114, 115, 116, 117, 118, 119 or 120. Byte boundary 113 is also called a double word (DW) boundary; byte boundary 117 is also called a full word (FW) boundary; and byte boundaries 115 and 119 are also called half word (HW) boundaries.

The architecture of a processor in FIG. 2 supports left to right instructions, i.e. instructions of variable operand byte length wherein the operand is fetched from memory 100 by sequentially accessed memory 100 from a low memory address to a higher memory address. Each left to right instruction defines (1) the addresses in main memory 100 where the first byte of the operand(s) that is to be fetched and/or stored can be found, (2) the byte length of the operand(s), and (3) pointer(s) that points to the first byte of the operand(s) within the DW of memory that is stored at the identified addresses.

The byte length of the operand is stored in 8-bit register L'. While not critical to the invention, the operand of the FIG. 2 embodiment can be up to 256 bytes long.

Main storage registers SA' and SB' are each DW wide, i.e. 8-bytes wide. Each of the registers SA' and SB' is provided with a 3-bit pointer register A' and B', respectively. As shown in FIG. 2, when register A' contains "000", register A' points to byte 0 in register SA'; when register A' contains "001", register A' points to byte 1 in register SA'; etc. This same relationship exists between register SB' and its byte pointer register B'.

A left to right instruction can be executed by way of a 16-way branch, as is determined by the content of alignment registers A' and B', and by the content of operand length register L'. The operand may be processed by 16-way branch instructions (1) one byte at a time, (2) two bytes (HW) at a time, (3) four bytes (FW) at a time, or (4) eight bytes (DW) at a time.

As the operand is thus processed, using the 16-way branch to execute a left to right instruction, registers A' and B' are incremented by a number that is equal to the number of bytes that are processed by the control word that is then being executed. Furthermore, registers A' and B' are set to these new values as this control word is being executed.

In addition, as the control word containing the 16-way branch is being executed, the L' register is being decremented by the same number of bytes being processed by that branch instruction.

In this way, the content of the registers A', B' and L' are used to define the address of one of the control word sequences to be used in the execution of the left to right instruction.

This is accomplished through the use of the above mentioned microcode branch called Move Character Branch (MBR).

When MBR is specified as a branch within a control word supporting a left to right instruction, the next control word to be executed is one of 16 control words. Each of these 16 branch destinations have unique conditions which must be satisfied before a particular destination control word is executed. Furthermore, during execution of a particular branch control word, the above mentioned registers A', B' and L' are being updated, to enable the address of the next control word containing an MBR control word to be defined.

The 16 conditions of registers A', B' and L' which define the 16 branch legs are shown in the following Table I for the implementation of the invention shown in FIG. 2 (the binary content of the registers is shown in decimal in this table). The value of L', A' and B' are the values that exist at the end of the cycle in which the values were changed, and these values are used to determine the address of the next control word to be executed. The content of the L' register equals the number of operand bytes remaining to be processed, less one. The content of the A' and B' registers are the pointers to the SA' and SB' registers, respectively. For example, A'=0 points to the first of the eight bytes in the SA' register (see FIG. 3).

TABLE I

| Branch leg number | L' | A' | B' |
|---|---|---|---|
| 0 | 7 | 0 | 0 |
| 1 | >7 | 0 | 0 |
| 2 | 3 | 0 or 4 | 0 or 4 |
| 3 | >3 | 4 | 0 |
| 4 | >3 | 4 | 4 |
| 5 | >3 | 0 | 4 |
| 6 | <7 and >3 | 0 | 0 |
| 7 | 1 | <7 | <7 |
| 8 | >1 | 6 | <6 |
| 9 | >1 | 6 | 6 |
| 10 | >1 | <6 | 6 |
| 11 | 2 | <6 | <6 |
|  | >1 | 1,2,3 or 5 | <6 |
|  | >1 | <6 | 1,2,3 or 5 |
| 12 | 0 |  |  |
| 13 | >0 | 7 | <7 |
| 14 | >0 | 7 | 7 |
| 15 | >0 | <7 | 7 |

Figure 3:
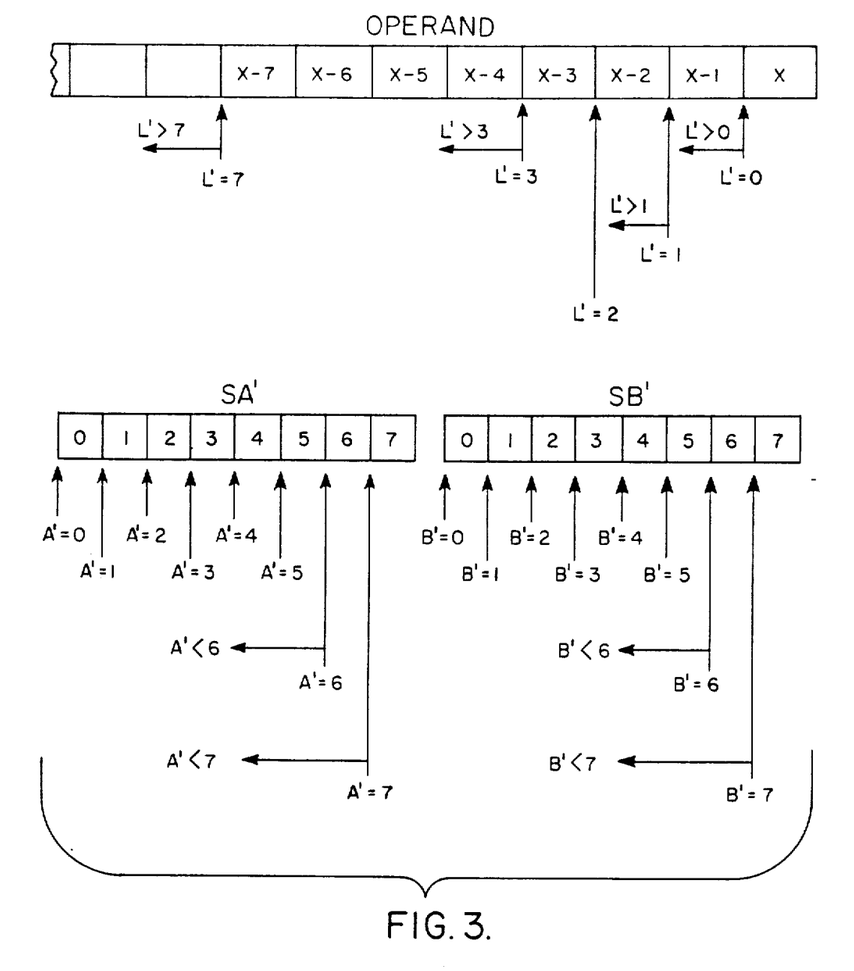
FIG. 3 is a showing of the information presented in Table I.

The conditions shown in Table I are also shown in FIG. 3, where the content of register L' is represented as the last eight bytes of an operand that is X bytes long, i.e. bytes "X−7" through "X" are the last eight bytes of the operand.

Note from branch leg number 12 in Table I that when the content of register L' is "00000000", execution of the left to right instruction by way of the MBR branch process is completed. In this instance, the content of the A' and B' registers is of no consequence.

The specific function to be accomplished by the control words depends upon the specific left to right instruction that was called for. The following Table II shows the control action that is taken by the 16 branch legs, above defined, for the left to right instruction Move Characters (MVC).

Table II

Branch Leg Number

0 L'=7, A'=0, B'=0 then: Store the 8-byte operand in SB' to the destination operand, and end.

1 L'>7, A'=0, B'=0 then: Store the 8-byte source operand in SB' to the destination operand. If there are more than 8 bytes of the source operand remaining after this store, continue moving 8 bytes at a time. MBR branch.

2 L'=3, A'=0 or 4, B'=0 or 4 then: Move a fullword from SB' to SA', begin the store from SA' and end the MVC operation, all in one machine cycle.

3 L'>3, A'=4, B'=0 then: Move a fullword from SB' to SA', begin the store from SA', and if there are fewer than 8 bytes still remaining to be moved, fetch the operand 1 background data to SA'. MBR branch.

4 L'>3, A'=4, B'=4 then: Move a fullword from SB' to SA', begin the store from SA', fetch source operand to SB', and if there are fewer than 8 bytes still remaining to be moved, fetch the operand 1 background data to SA'. MBR branch.

5 L'>3, A'=0, B'=4 then: Move a fullword from SB' to SA', fetch the source operand to SB'. MBR branch.

6 7>L'>3, A'=0, B'=0 then: Move a fullword, then a halfword, and/or a byte from SB' to SA'. Begin the store to destination operand in the same cycle as the byte or halfword move. End 7 L'=1, A'<7, B'<7 then: Move a potentially unaligned halfword from SB' to SA'. Begin the store to destination operand in the same cycle as the halfword move. End 8 L'>1, A'=6, B'<6 then: Move a potentially unaligned halfword from SB' to SA'. Begin the store to destination operand in the same cycle as the halfword move. If there are fewer than 8 bytes still remaining to be moved, fetch the operand 1 background data to SA'. MBR branch.

9 L'>1, A'=6, B'=6 then: Move a halfword from SB' to SA'. Begin the store to the destination operand in the same cycle as the halfword move. Fetch the next doubleword of the source operand to SB' If there are fewer than 8 bytes remaining to be moved, fetch the operand 1 background data to SA'. MBR branch.

10 L'>1, A'<6 B'=6 then: Move a potentially unaligned halfword from SB' to SA'. In the same cycle as the move, begin the fetch of the next doubleword of source operand to SB'. MBR branch.

11 L=2, A'<6, B'<6 or, L'>1, A'=1,2,3 or 5, B'<6 or, L'>1, A'<6, B'=1,2,3 or 5 then: Move a potentially unaligned halfword from SB' to SA'. MBR branch.

12 L'=0 then: Move a byte of source operand in SB' to SA', begin the store of SA' to operand 1, and end the operation.

13 L'>0, A'=7, B'<7 then: Move a byte of source operand in SB' to SA', begin the store of SA' to operand 1. If there are fewer than 8 bytes still remaining to be moved, fetch the operand 1 background data to SA' MBR branch.

14 L'>0, A'=7, B'=7 then: Move a byte of source operand in SB' to SA'. In the same cycle as the move, begin the fetch of the next doubleword of source operand to SB'. Begin the store of SA' to operand 1. If there are fewer than 8 bytes remaining to be moved, fetch the operand 1 background data to SA'. MBR branch.

15 L'>0, A'<7, B'=7 then: Move a byte of source operand in SB' to SA'. In the same cycle as the move, begin the fetch of the next doubleword of source operand to SB'. MBR branch.

Figure 6:
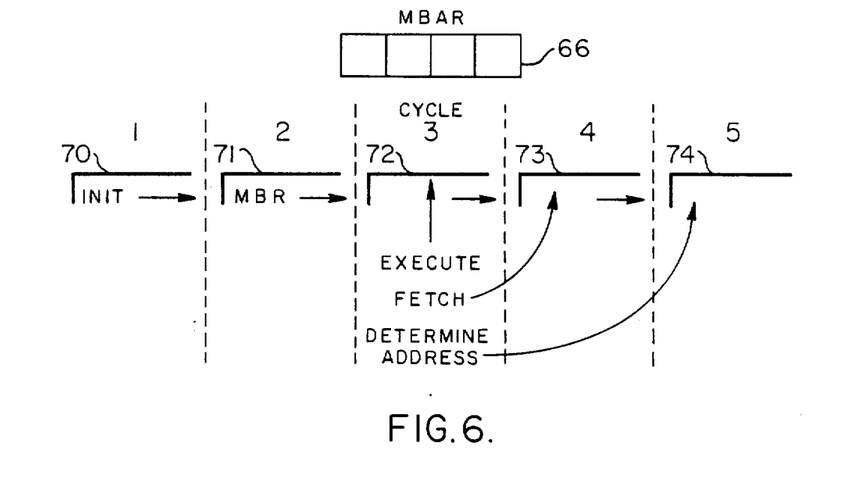
FIG. 6 shows the way in which the present invention, in one cycle, (1) executes a control word, (2) fetches the next cycle's control word, and (3) determines the control store address for the control word that will be fetched in the next cycle.

With reference to FIG. 6, this figure shows five consecutive cycles of operation of the system hardware of FIG. 2, wherein control words 70, 71, 72 , 73 and 74 are sequentially executed in cycles 1, 2, 3, 4 and 5.

With reference to cycle 3 of FIG. 6, the system hardware of FIG. 2 fetches the next control word 73 to execute from control store while the current control word 72 is being executed during cycle 3. It is important to note that the content of control word 73 includes the number of operand bytes to be processed in cycle 4.

The address of the next control word 74 to be fetched from control store in cycle 4 is determined very early in cycle 3. This is done as follows.

The address of next control word 74 to be fetched from control store is, in accordance with the invention, based upon the values in alignment registers A' and B', and the value in length register L', that will exist after control word 73 has been executed in cycle 4.

However, control word 73 has been fetched from control store very early in cycle 3. Thus, the number of bytes to be processed in cycle 4 is known at a time very early in cycle 3. This value is now used to change the contents of registers A', B' and L' so that the new content of these registers reflects the effect of executing control word 73 in cycle 4.

As a result, the new content of these registers can now be used, very early in cycle 3, to determine the address of control word 74 for cycle 5.

This process can be summarized as follows, in any given cycle N, (1) the control word for cycle N+1 is fetched from control store, (2) the byte-processing content of the control word for cycle N+1 is used to calculate the new values of A', B' and L' that will result from execution of control word N+1, and (3) these new values of A', B' and L' are used to determined the address of the control word to be fetched from control store in cycle N+1, and to be executed in cycle N+2.

The system hardware of the data processing system of FIG. 2 performs the MBR function of the invention by determining the control store address bits that will be used at the next MBR branch during the execution of any control word that specifies an MBR branch (or and when an MBI command is detected—MBI is used to initialize the CPU to the start of the string, for processing a left to right instruction—see 70 of FIG. 6).

These control word address bits are stored in a 4-bit register 66 called MBAR (Move Branch Register Address). This register is used exclusively for left to right instruction execution.

The MBAR register contains the address of 1 of the 16 control words to be fetched from control store when hardware detects an MBR branch. The value loaded into the MBAR register for use during the next MBR cycle is determined when a branch condition is detected. In this situation the value MD (equal to the number of bytes processed prior to the next MBR branch, and defined below) is subtracted from the L' register, and is added to the A' and the B' registers. The values found in A', B' and L' are then tested against the branch conditions specified in Table III. If a condition is found, the 4-bit control word address is stored in the MBAR register. The old MBAR value is used to address the control store, in order to retrieve the next MBR instruction.

The 16-way MBR branch of this invention is dependent upon the content of the MBAR register, as shown in Table III. The value to be loaded into the MBAR register is determined when a branch condition is determined. MBAR contains "0000" when initialized, see 70 of FIG. 6. The value of MD is determined by the current value of MBAR and is based upon the number of bytes that hardware determines registers L', A' and B' will be changed by execution of the next MBR branch control word. This change reflects the number of bytes in the operand string that will be processed in the next MBR machine cycle.

Figure 4:
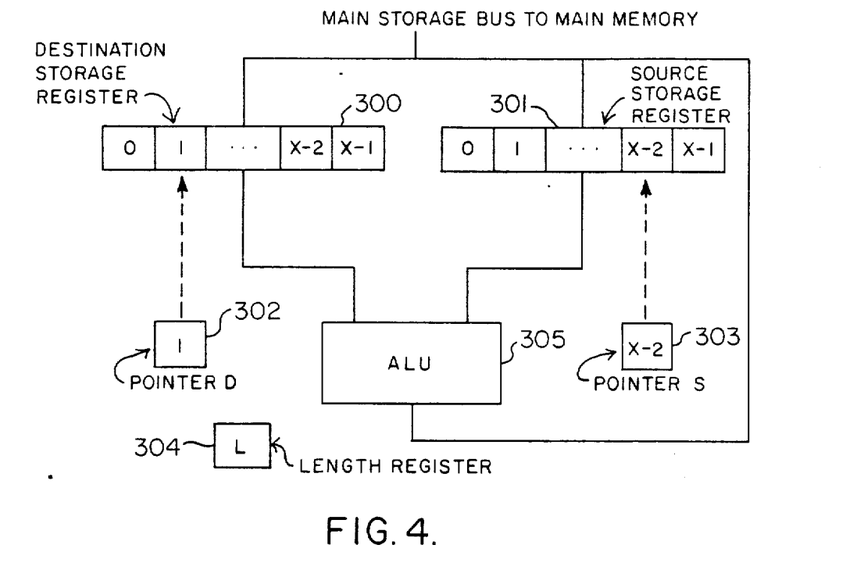
FIG. 4 is a generic showing of the invention.

A pointer register 302 and 303 is needed for each of the storage registers 300 and 301, respectively. Each pointer register points to a byte in its respective storage register. In addition, a length register 304 contains the number of bytes of the operand string that remain to be processed.

For this analysis of the generic showing of the invention, the following terms are defined:

X is the number of bytes that storage registers 300 and 301 will hold. This is also the width of the system's main storage bus.

W is the number of bytes that ALU 305 can process in one cycle.

X−W is a positive constant number (i.e. storage registers 300 and 301 are equal to or larger than ALU 305), and is equal in magnitude to the number of bytes by which the byte-size of these registers exceed the byte-size of the ALU.

D and S are the numbers contained in pointer register 302 and pointer register 303, respectively. Assuming that either of the storage registers 300, 301 may be the source or the destination of the left to right instruction, the values of S and D can range from 0 to X-1. The value X-1 indicates that the last byte of operand portion then in the register remains to be operated upon (see FIG. 4).

L is the number contained in length register 304, i.e. the number of operand bytes remaining to be processed as the left to right instruction is executed. L

TABLE III

| 4-bit address loaded in MBAR for control word addressing | Branch Condition | Next MD MBAR Decode (decimal) |
|---|---|---|
| 0 | L'−MD=7, A'+MD=0, B'+MD=0 | 8 |
| 1 | L'−MD>7, A'+MD=0, B'+MD=0 | 8 |
| 2 | L'−MD=3, A'+MD=0 or 4, B'+MD=0 or 4 | 8 |
| 3 | L'−MD>3, A'+MD=4, B'+MD=0 | 4 |
| 4 | L'−MD>3, A'+MD=4, B'+MD=4 | 4 |
| 5 | L'−MD>3, A'+MD=0, B'+MD=4 | 4 |
| 6 | 7> L'−MD>3, A'+MD=0, B'+MD=0 | 4 |
| 7 | L'−MD=1, A'+MD<7, B'+MD<7 | 8 |
| 8 | L'−MD>1, A'+MD=6, B'+MD<6 | 2 |
| 9 | L'−MD>1, A'+MD=6, B'+MD=6 | 2 |
| 10 | L'−MD>1, A'+MD<6, B'+MD=6 | 2 |
| 11 | L'−MD=2, A'+MD<6, B'+MD<6 | or, |
|  | L'−MD>1, A'+MD=1,2,3 or 5, B'+MD<6 | or, |
|  | L'−MD>1, A'+MD<6, B'+MD=1,2,3 or 5 | 2 |
| 12 | L'−MD=0 | 1 |
| 13 | L'−MD>0, A'+MD=7, B'+MD<7 | 1 |
| 14 | L'−MD>0, A'+MD=7, B'+MD=7 | 1 |
| 15 | L'−MD>0, A'+MD<7, B'+MD=7 | 1 |

The MBAR decode is of no significance when MBAR=0, 2, 6, 7 or 12 since the next MBR branch will result in completion of the left to right instruction and the new value loaded into MBAR will not be used.

FIG. 4 shows the invention in a generic form.

In order to apply the invention to different programmable data processing systems, the processor must have the capability to do multiple way branches. That is, the next instruction can be any one of a number of instructions in a defined branch structure. The processor will make a branch based upon a number of conditions.

The processor must have two or more main storage interface registers 300 and 301 which hold data that is fetched from, or is to be stored to, main memory (not shown).

can range from 0 to any predefined limit.

In order to implement the Move Character Branch (MBR) of the invention, a special microprogrammed branch command, such as MBR, must be defined. When this defined command is specified in a control word (microinstruction), such as in a left to right instruction, the special string processing of this invention is invoked. When this defined command is not specified, the string processing of this invention ends, and normal processing resumes.

Assuming that the special string processing of this invention begins at byte 0, and progresses through successive bytes in both storage registers 300, 301 (i.e. a left to right instruction), the pointer registers 302, 303 are incremented, and length register 304 is decremented, by a number that is equal to the number of bytes processed by the last branch control word or instruction.

The method and apparatus of the present invention, which can also be called the algorithm of the invention, decides how many bytes within storage registers 300, 301 are to be processed by the branch instruction, based upon the positions of the starting bytes in the source and destination operands, and the number of bytes of the operands that remain to be processed.

The following list shows operation of the invention for a typical Move Character (MVC) left to right instruction.

1 If $L=W$, $S<X-W+1$, $D<X-W+1$ then: process W bytes and end.

2 If $L>W$, $S<X-W+1$, $D<X-W+1$ then: process W bytes in the storage register, increment S and D by W, decrement L by W, and continue.

3 If $L>W$, $S=X-W$, $D<X-W+1$ then: process W bytes in the storage register, fetch X new bytes to the source register, increment S and D by W, decrement L by W, and continue.

4 If $L>W$, $S=X-W$, $D=X-W$ then: process W bytes in the storage register, store the content of the destination register to the destination, Fetch X new bytes to the storage register, increment S and D by W, decrement L by W, and continue.

5 If $L>W$, $S<X-W+1$, $D=X-W$ then: process W bytes in the storage register, store the content of the destination register to the destination, increment S and D by W, decrement L by W, and continue.

6 If $L>0$, $S>X-W$, $D>X-W$ then: process $X-S$ or $X-D$ or L bytes (whichever is smaller), increment S and D and decrement L by the number of bytes processed, store the content of the destination register to the destination if new $D=0$, fetch X new bytes to the source register if new $L\neq0$ and new $S=0$, and continue.

7 If $L>0$, $S=X-1$, $D<X-1$ then: process one byte (the last byte) in the storage register, increment S and D by 1, decrement L by 1, fetch X new bytes to the source register if new $L\neq0$, and continue.

8 If $L>0$, $S=X-1$, $D=X-1$ then: process one byte (the last byte) in the storage register, store destination register to destination, increment S and D by 1, decrement L by 1, fetch X new bytes to the source register if new $L\neq0$, and continue.

9 If $L>0$, $S<X-1$, $D=X-1$ then: process one byte (the last byte) in the storage register, store the content of the destination register to the destination, increment S and D by 1, decrement L by 1, and continue.

If $L=0$ then: end.

Each of the items in this list represent a leg of a multi way branch, and each item represents a control word, or a group of control words, that do operations such as ADD, COMPARE, MOVE, FETCH or STORE. Each of these control words, or the last control word of a group of control words, that specifies "continue", specifies the special branch command to continue string processing of the operand, while the ones specifying "end" do not specify this special command to continue the string processing.

In the above description, the invention's MBR branch instructions are shown in Table I. The invention has been explained relative to the specific architecture shown in FIG. 2. The invention has also been explained relative to the general architecture of FIG. 4. Both of these explanations have been for the exemplary left to right instruction Move Characters (MVC). Those of skill in the art will therefore be readily able to apply this invention to the execution of other left to right instructions, for whatever hardware architecture is involved.

While the invention has been described in terms of moving a byte aligned string of bytes from a source storage location to a destination storage location of equal length, it is clear that the invention is applicable to the implementation of other instructions which process at least one operand in storage from one storage address to another storage address.

The present invention is of general utility, and its spirit and scope are defined in the claims hereof.

What is claimed is:

1. A branching method for processing an operand that is Y bytes long and comprises byte-1 through byte-Y by the use of a left to right program instruction that defines the number Y of operand bytes to be processed by the instruction, using a data processing system having a data bus that is X bytes wide, where X is less than Y, main storage means having a plurality of multi-byte storage locations containing said operand wherein each of said storage locations includes a byte boundary for each of the bytes stored therein and wherein byte-1 of said operand may be stored within a storage location at any of said byte boundaries, and at least two registers that interface with said main storage means, each of said registers having a byte width at least as large as X and each of said registers including a byte boundary for each of the bytes thereof, the method comprising the steps of in a given processing cycle, fetching X bytes from said main storage means to at least one of said registers, said fetched X bytes including byte-1 of said operand, byte-1 of said operand thereafter being located at one of the byte boundaries of said at least one of said registers, in said given processing cycle, determining the byte alignment of byte-1 of said operand in said at least one of said registers with respect to the byte boundaries of said at least one of said registers, processing from 1 to X bytes of said operand in said given processing cycle, dependent upon said determined byte alignment of byte-1 of said operand in said at least one of said registers, in said given processing cycle, determining how many operand bytes will remain to be processed after said given processing cycle by the left to right instruction relative to the Y number of bytes defined by the left to right instruction, and in said given processing cycle, determining which of a plurality of branching control words are to be executed in the cycle following said given processing cycle, based upon said determined operand bytes remaining to be processed.

2. The method of claim 1 wherein X equals eight bytes, and wherein a variable number of operand bytes are processed in at least some of a number of processing cycles, the variable number of bytes so processed being based upon how many operand bytes remain to be processed, and being based upon the byte alignment of said operand in said at least one of said registers, as these parameters exist at the end of each processing cycle in which one byte, two bytes, four bytes or eight bytes have been processed.

3. The method of claim 1 wherein said left to right instructions are contained in said main storage means, and said branching method is supported by microcode that is contained in a control storage means, said microcode comprising a plurality of control words, each of which identifies the number of bytes to be processed when the control word is executed, and including the steps of, fetching a control word from said control storage means as a result of a left to right instruction being fetched from said main storage means, executing said fetched control word in cycle N, and in said cycle N, fetching from said control storage means the next control word that is to be executed in cycle N+1, and using said next control word's number of bytes to be processed in cycle N+1 to determine the address of the control word to be executed in cycle N+2.

4. The method of claim 2 wherein said left to right instructions are contained in said main storage means, and said branching method is supported by microcode that is contained in a control storage means, said microcode comprising a plurality of control words, each of which identifies the number of bytes to be processed by the control word, and including the steps of fetching a control word from said control storage means as a result of a program left to right instruction being fetched from said main storage means, executing a control word in a cycle, and in said same cycle, fetching the next control word from said control storage means, and using said next control word's number of bytes to be processed to determine the address of the next following control word.

5. A branching method for processing at least one multi-byte operand that is Y bytes long and comprises byte-1 through byte-Y by the use of a left to right program instruction that defines the number Y of operand bytes to be processed by the instruction by using a data processing system having a data bus that is X bytes wide, where X is less than Y, and includes main storage having a plurality of multi-byte storage locations containing said operand, wherein said storage locations of said main storage include a byte boundary for each of the bytes stored therein and wherein byte-1 of said operand may be stored with in a storage location at any of said byte boundaries, and at least two registers that interface with said main storage, each of said registers having a byte width at least as large as X, and each of said registers including a byte boundary for each of the bytes therein, (1) in a given machine cycle, fetching X bytes from a storage location of said main storage to at least one of said registers, said fetched X bytes including byte-1 of said operand, byte-1 of said operand thereafter being located at one of the byte boundaries of said at least one of said registers, (2) in said given machine cycle, determining the byte alignment of byte-1 of said operand in said at least one of said registers with respect to the byte boundaries of said at least one of said registers, (3) in said given machine cycle, processing from 1 to X bytes of said operand in said given machine cycle, dependent upon said determined byte alignment of byte-1 of said operand in said at least one of said registers, (4) in said given machine cycle, determining how many operand bytes remain to be processed by the left to right instructions after said given machine cycle, relative to the Y number of bytes defined by the left to right instruction, (5) in said given machine cycle, determining which of a plurality of branching words are to be executed in the machine cycle immediately following said given machine cycle, based upon said determined operand bytes remaining to be processed, and (6) repeating steps (1), (2), (3), (4) and (5) until all operand bytes have been processed.

6. The method of claim 5 wherein said left to right instructions are contained in said main storage, and said branching method is supported by microcode that is contained in a control store, said microcode comprising a plurality of control words, each of which identifies the number of bytes to be processed when the control word is executed, and wherein said step (6) includes the steps of fetching a control word from said control store as a result of a left to right instruction being fetched from said main storage, executing said fetched control word in cycle N, and in said cycle N, fetching the next control word that is to be executed in cycle N+1 from control store, and using said next control word's number of bytes to be processed to determining the address of the control word to be executed in cycle N+2.

7. A data processing system having a process width of X bytes, for executing program instructions, including left to right instructions, wherein data fields in said left to right instructions define (1) the byte length of at least one operand to be processed by the left to right instruction, and (2) at least one operand address in a main store means, said system comprising, main store means storing (1) program instructions, including said left to right program instructions, and (2) operands to be processed by said a left to right instruction, each of said operands being stored in said main store means with beginning byte alignment, beginning at a low main store address, and at least some of said operands having a byte length longer than X bytes, so that their addresses end at a higher main store address, control store means storing control words for implementing a branch when a left to right instruction is executed, at least some of said control words defining a variable number of operand bytes to be processed by the control word, not exceeding X bytes, at least two interface registers, each of which is X bytes wide, said registers interfacing with said main storage means, and being operable to receive the X byte content at an address of said main memory means that contains at least byte portions of an operand, as a left to right instruction is executed, a pointer register for each of said interface registers, said pointer registers being operable to contain changeable values that dynamically point to operand bytes in said interface registers that remain to be processed by a left to right instruction, a length register operable to receive the byte length of the operand to be processed by a left to right instruction, and is operable to be dynamically changed as a left to right instruction is executed, means responsive to fetching of a control word for incrementing said pointer registers, and decrementing said length register by the number of bytes to be processed by the fetched control word, and means responsive to the resulting values stored in said pointer registers and said length register operable to define the address of a subsequent control word to be executed.

8. The data processing system of claim 7 including means whereby the content of said pointer registers and said length register, as said content exist in a given machine cycle N are used to determine the control word to be fetched in cycle N+1 and to be executed in cycle N+2.

* * * * *